(12) United States Patent
Bott et al.

(10) Patent No.: US 8,922,072 B2
(45) Date of Patent: Dec. 30, 2014

(54) ELECTRICAL MACHINE WITH A COOLING CHANNEL AND METHOD FOR MANUFACTURING THE SAME

(75) Inventors: Erich Bott, Hollstadt (DE); Hubertus Bähr, Bad Königshofen (DE); Rolf Vollmer, Gersfeld (DE)

(73) Assignee: Siemens Aktiengesellschaft, Munich (DE)

(*) Notice: Subject to any disclaimer, the term of this patent is extended or adjusted under 35 U.S.C. 154(b) by 358 days.

(21) Appl. No.: 13/392,006

(22) PCT Filed: Aug. 17, 2010

(86) PCT No.: PCT/EP2010/061976
§ 371 (c)(1),
(2), (4) Date: Feb. 23, 2012

(87) PCT Pub. No.: WO2011/023598
PCT Pub. Date: Mar. 3, 2011

(65) Prior Publication Data
US 2012/0146435 A1 Jun. 14, 2012

(30) Foreign Application Priority Data
Aug. 24, 2009 (DE) .......................... 10 2009 038 691

(51) Int. Cl.
*H02K 9/00* (2006.01)

(52) U.S. Cl.
USPC ............................................... 310/52; 310/64

(58) Field of Classification Search
USPC ............. 310/52, 54, 58, 59, 64, 60 A; 29/596
See application file for complete search history.

(56) References Cited

U.S. PATENT DOCUMENTS

| | | | |
|---|---|---|---|
| 5,448,118 A * | 9/1995 | Nakamura et al. .............. | 310/54 |
| 5,939,808 A | 8/1999 | Adames | |
| 6,633,097 B2 * | 10/2003 | Dunlap et al. .................. | 310/54 |
| 7,800,259 B2 * | 9/2010 | Elgas et al. ..................... | 310/52 |
| 2002/0167100 A1 * | 11/2002 | Moszner et al. ................ | 264/16 |
| 2002/0195885 A1 * | 12/2002 | Tsuneyoshi et al. ............ | 310/43 |
| 2005/0151431 A1 * | 7/2005 | Cronin et al. ............... | 310/60 A |
| 2008/0278011 A1 | 11/2008 | Elgas | |
| 2009/0102298 A1 * | 4/2009 | Savant et al. ................... | 310/52 |

FOREIGN PATENT DOCUMENTS

| | | |
|---|---|---|
| DE | 19842948 A | 9/1998 |
| DE | 19757605 A1 | 6/1999 |
| WO | WO 9744882 A1 | 11/1997 |

* cited by examiner

*Primary Examiner* — Hanh Nguyen
(74) *Attorney, Agent, or Firm* — Henry M. Feiereisen LLC

(57) ABSTRACT

The invention relates to a stator (1) of an electrical machine (10), the electrical machine (10) itself, and a manufacturing method. The stator (1) has a meandering cooling channel (18), wherein the meandering cooling channel (18) is embedded in an element (22), wherein the element (22) comprises a material which is influenced thermally so as to form a shape of the element (22), wherein an iron-containing body (3), for guiding a magnetic field of the stator, is embedded in the element (22).

27 Claims, 4 Drawing Sheets

ELECTRICAL MACHINE WITH A COOLING CHANNEL AND METHOD FOR MANUFACTURING THE SAME

CROSS-REFERENCES TO RELATED APPLICATIONS

This application is the U.S. National Stage of International Application No. PCT/2010/061976, filed Aug. 17, 2010, which designated the United States and has been published as International Publication No. WO 2011/023598 and which claims the priority of German Patent Application, Serial No. 10 2009 038 691.2, filed Aug. 24, 2009, pursuant to 35 U.S.C. 119(a)-(d).

BACKGROUND OF THE INVENTION

The invention relates to an electrical machine or the stator of an electrical machine. The invention also relates to a manufacturing method for a stator of an electrical machine and a method for manufacturing the electrical machine itself.

SUMMARY OF THE INVENTION

It is an object of the invention to improve the cooling of an electrical machine or the stator of the electrical machine. A further object of the invention is to improve a manufacturing method for an electrical machine or a stator of the electrical machine.

According to one aspect of the invention, said problem is achieved with a stator of an electrical machine having a meandering cooling channel, the meandering cooling channel being embedded in an element which includes a material which is thermally influenced to form the embedding, an iron-containing body for guiding a magnetic field of the stator also being embedded in the element.

According to one aspect of the invention, said problem is achieved with a method for manufacturing a stator of an electrical machine, wherein the iron-containing body is placed in a mold, wherein a cooling channel is placed the mold, and the mold is filled with the material of the element for embedding the cooling channel and the yoke, wherein for filling, the material is heated.

A stator of an electrical machine comprises, for example, a laminated or lamellar iron body. Said iron body serves to guide a magnetic field. Said iron-containing body for guiding the magnetic field is, for example, a yoke.

The electrical machine comprises a stator and a rotor. The electrical machine also comprises, for example, end housings.

In one embodiment of the stator of the electrical machine, the stator has a meandering cooling channel. Using a meandering cooling channel, a fluid can be deflected in the flow direction thereof for cooling the electrical machine or the stator. The fluid is, in particular, a coolant such as water or liquid nitrogen. The meandering cooling channel is (wholly or partially) embedded in an element which is thermally treated for the molding thereof. An element of this type is made, for example, from a plastics material which can be subjected to an injection molding process. Another example of a material for the element for embedding the cooling channel is aluminum, which can be subjected to a casting process. Also at least partially embedded in the element, that is, in the material of the element in which at least one cooling channel is embedded is a, particularly, iron-containing body for guiding a magnetic field of the stator. The embedding material therefore at least embeds a cooling channel and the body (the element) of the stator, which is provided for guiding the magnetic flux. The embedding provides a good heat-conducting contact between the embedding material and the cooling channel. Said contact is substantially improved in relation to a system wherein cooling channels are merely set into bores of a stator lamination stack.

In another embodiment of the stator, the element for embedding comprises a sintered material. Such materials have, for example, a ceramic component. By this means, a very solid and also heat-resistant form can be created. The element for embedding can be configured such that a part of a housing of the stator or even the electrical machine itself is formed therefrom. This extended function is naturally not restricted to the use of sintered material, but is also achievable with other material types. Other material types are, for example, plastics or aluminum or aluminum alloys.

In a further embodiment of the stator, the element for embedding comprises a material which can be cast. Aluminum is an example thereof. For this use, the aluminum would wholly or partially enclose both cooling channels and also, for example, a yoke for guiding a magnetic field. Aluminum has the advantages of being easy to machine and of conducting heat well.

In a further embodiment of the stator, the element which embeds cooling channels and, in particular, a yoke, is made of an injection molded material. Plastics are an example of materials which are suitable for injection molding. If, for example, the cooling channel is also made from a plastics material, it is advantageous to ensure that the plastics from which the cooling channel is made (e.g. plastics of a plastics pipe) has a higher melting point than the plastics used for embedding the cooling channels or the material for guiding the magnetic flux. The use of a plastics injection molding method leads to simplification of the manufacturing process for the stator, since said method can be easily and inexpensively realized.

In a further embodiment of the stator, said stator can also be made by means of 3-D printing. With 3-D printing, for example, UV light or laser light can be used for curing the embedding material. Using 3-D printing, changes to the form and design of the stator can be realized rapidly. Time-consuming adaptation or new acquisition of casting molds or injection molds are not necessary.

In a further embodiment of the stator, said stator has a meandering pipe as the basis of a meandering cooling channel. The pipe can be configured multi-part or one-part. In one embodiment, the pipe configured in one part has not only a single meandering loop, but a plurality of meandering loops, so that the direction of flow of a fluid can be subjected to a plurality of changes.

The material of the pipe can comprise, for example, stainless steel, copper or plastics. An advantage of copper or stainless steel is that said materials have a higher melting point than plastics. It is essentially advantageous if the material of the pipe has a higher melting point than the material which serves to embed the pipe or the yoke (means for guiding a magnetic field).

In a further embodiment of the stator, the material of the pipe is partially melted. Said melting occurs, for example, during casting of the aluminum that is used to embed the cooling channels/pipes. The melting results in a good heat-conducting connection between the pipe material and the embedding material.

In a further embodiment of the stator, the pipe has at least one wind/loop, the pipe being made in one part and the wind/loop is arranged, particularly, partially in the region of an end housing. The bearing is then embedded by means of the same material as the cooling channels and the yoke.

In a further embodiment of the stator, one part of the cooling channels is oriented and embedded in an axial direction and another part of the cooling channels is oriented and embedded in a circumferential direction. By means of the cooling channels oriented in the circumferential direction (in relation to the axis of the electrical machine), the loops/winds of the cooling channels are provided in order to reverse the direction of the flow of fluid.

In a further embodiment, the stator has a cuboid form, the stator being free from axial cooling channels in a central region of the sides of the stator. Said design enables a compact structure of the stator or the associated electrical machine.

In a further embodiment of the stator, in the element which serves for embedding the cooling channels, said element also embedding the means for guiding the magnetic field (e.g. the yoke), fastening holes for receiving fastening screws are provided. The fastening relates, for example, to the fastening of an end housing. In a further variant, the stator can also be fastened with end housings to another device (e.g. a mounting plate). In that the fastening holes are integrated in the element, a simple design is produced.

In a further embodiment of the stator, the fastening holes are provided in the corner regions of the stator, the corner regions being, in particular, free from cooling channels extending axially. This arrangement results in a compact construction.

In a further embodiment of the stator, the stator has a yoke stack and a star-shaped stack, the yoke stack and the star-shaped stack comprising at least part of the iron-containing body for guiding the magnetic field. The iron-containing body for guiding the magnetic field can therefore be configured not only one-part in the radial direction, but also multi-part. Given a two-part embodiment in the radial direction, the yoke stack is combined with the star-shaped stack. Naturally, in both the one-part embodiment and the multi-part embodiment (seen, respectively, in a radial view) a core lamination can be provided. This lamination stack of the stator is embedded in the element in which the cooling channels are also embedded. The lamination stack and the cooling channel are therefore embedded in the same element and consequently in the same material. In this regard, a pipe which is, for example, merely pushed into a hollow space, is not considered to be an embedded tube since gap dimensions play a part herein. Embedding results in a snug interface.

The element for embedding can also be configured such that, apart from the one cooling channel or the plurality of cooling channels and the means for guiding the magnetic field (yoke, stator lamination stack), one end housing or two end housings are also integrated. The element for embedding therefore also accommodates the bearings which are provided for mounting a rotor of the electrical machine.

In a method for manufacturing a stator of an electrical machine having at least one of the above described features of a stator, the iron-containing body is placed in a mold, wherein a cooling channel (e.g. a pipe) is also placed in the mold, and the mold is filled with a material which forms the element, said element embedding the iron-containing body and the cooling channel. The iron-containing body is, in particular, a yoke, wherein it is sufficient for forming an embedding that the element for embedding makes contact with the iron-containing body directly and snugly. For the embedding of the cooling channel, also, there is a direct snug contact of the element for embedding with the cooling channel, for example, the pipe. For the embedding of the cooling channel, said channel can also be entirely enclosed by the element in a circumferential direction. Consequently, a pipe which functions as a cooling channel can be enclosed in the radial extent thereof by the element.

BRIEF DESCRIPTION OF THE DRAWING

The invention will now be described in greater detail making reference to possible exemplary embodiments shown in the drawings, in which.

DETAILED DESCRIPTION OF PREFERRED EMBODIMENTS

Figure 1:
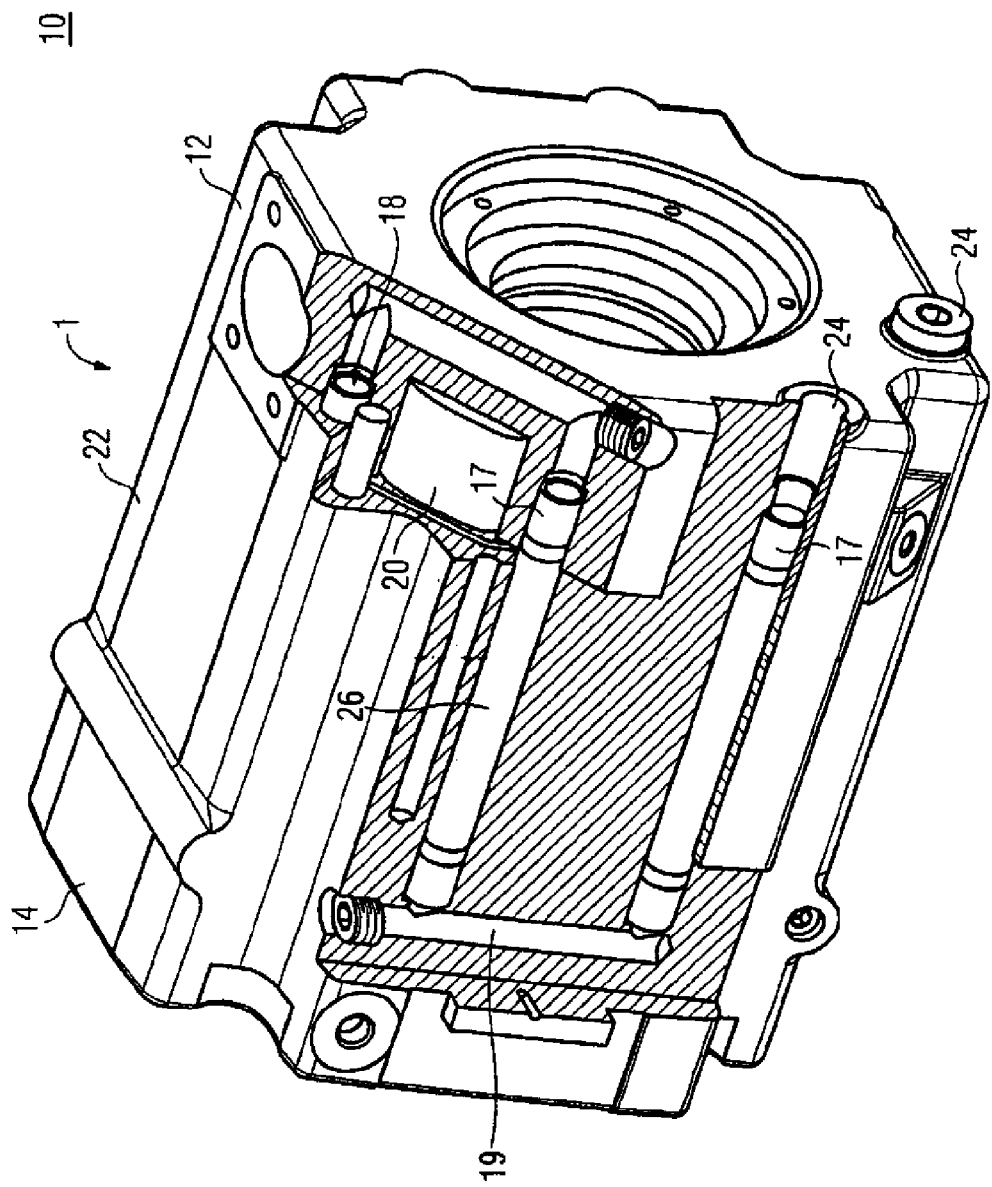
FIG. 1 is a cast electrical machine.

FIG. 1 shows an electrical machine 10 wherein, in the representation illustrated, no rotor of the electrical machine 10 is shown. The electrical machine 10 has a stator 1. A stator lamination stack (not visible in this representation) is embedded in an element 22. The stator lamination stack is an iron-containing body for guiding a magnetic field, the stator lamination stack being surrounded by the element 22 so as not to be visible in FIG. 1.

The electrical machine 10 also comprises two end housings 12, 14. A first end housing 12 can be designated the operational side end housing 12. A second end housing 14 can be designated the drive side end housing 14. If current is passed through windings 20 of the stator 1 of the electrical machine 10, heat losses occur. In order to conduct heat away, that is, to cool the electrical machine 10, a meandering cooling channel 18 is provided. The meandering cooling channel 18 has axially oriented cooling channels 17 and deflection channels 19 oriented in a circumferential direction of the electrical machine. To form the cooling channel 18, a pipe 26 can be used. A hose is also considered to be a pipe in this context. The cooling channel 18 can be formed by joining together pipes or in that a pipe is configured in one part and arranged in a meandering form. The cooling channel 18 has connections 24 in order to feed the cooling channel 18 with a coolant. Water is an example of a frequently used liquid coolant. The cooling channel 18 is integrated into the electrical machine, particularly by means of a casting process. For example, aluminum is cast into a mold in which the cooling channel (e.g. steel pipes or copper pipes) or cooling channels and the stator lamination stack are already arranged. Said channel(s) then become(s) embedded in the cooled aluminum. The described embodiment of the electrical machine has, for example, the following advantages:

complex machining of the end housing for water deflection is dispensed with;

complex sealing of cooling pipes to deflection pockets is dispensed with;

improved and simpler heat-conducting contact of the cooling channel, particularly with the stator lamination stack; and improved heat conduction to the end housings so that it is not only essentially one cooling pipe surface that contributes to the cooling in the region of the yoke.

Figure 2:
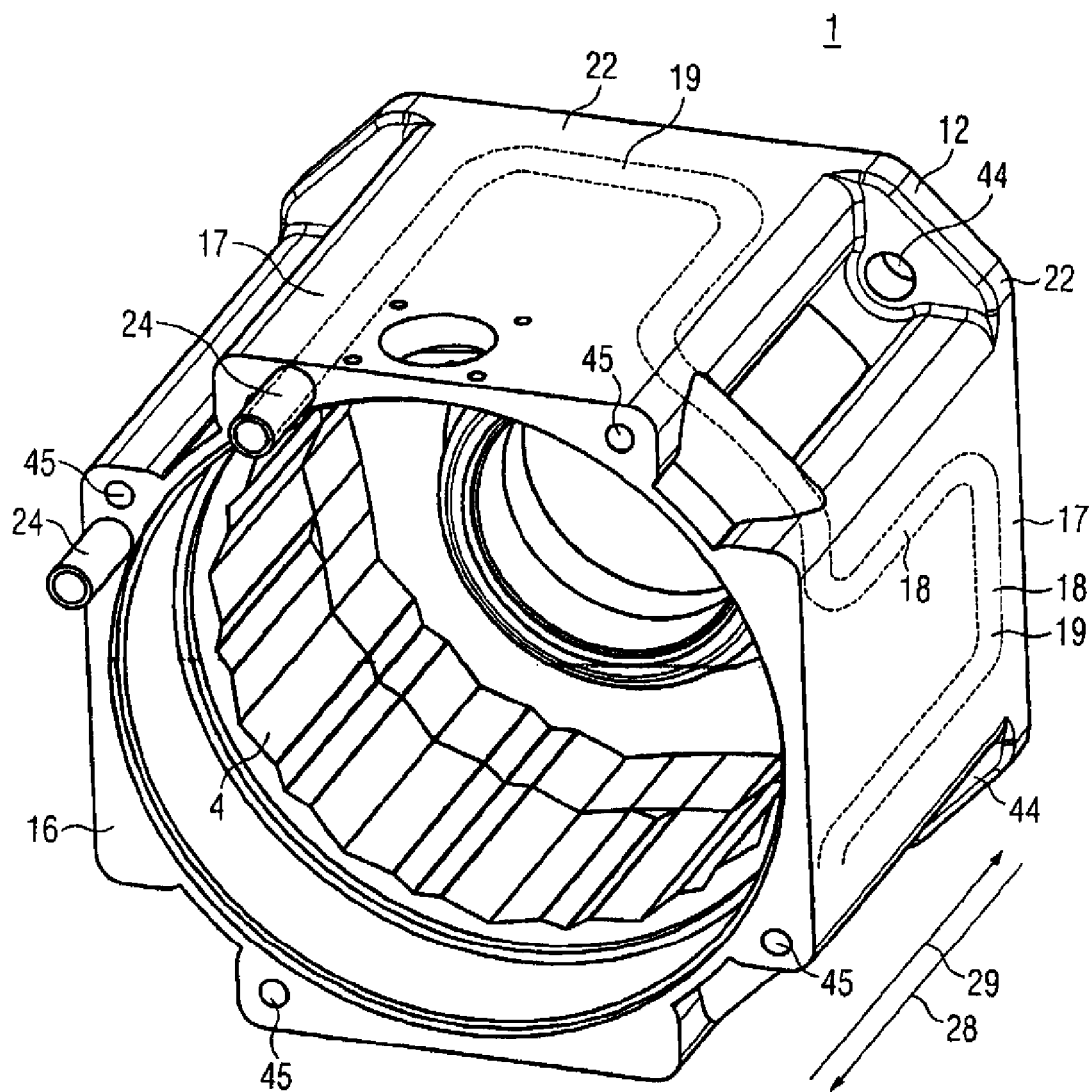
FIG. 2 is a cast stator.

FIG. 2 shows a stator 1, a housing of said stator also being formed by the element 22 for embedding. An end housing 12 is integrated into the element 22. Fastening holes 45 are provided on the side of the stator 1 opposing the end housing 12. Said fastening holes 45 are usable, for example, for fastening a further end housing via a housing flange 16, which is not shown. One end housing is, for example, a drive side end housing and the other end housing is an operational side end housing.

In a further embodiment of the stator 1 (not shown) said stator has no integrated end housing. In an embodiment of the stator of this type, the stator has corresponding fastening possibilities at the end faces thereof for end housings. The element 22 shown in FIG. 2 has fastening holes 44 which serve, for example, for fastening the stator 1 or the entire electrical machine. A single cooling channel 18 is cast into the element 22. The cooling channel 18 has axially arranged cooling channel sections (cooling channels) 17 and sections 19 which serve for deflecting the flow direction of a coolant. Said deflection channels 19 are arranged in a circumferential direction and are integrally connected to the axial cooling channels 17. The axial direction is indicated by arrows 28, 29, which also show the possible axial flow directions of the fluid. According to the embodiment shown in FIG. 2, the deflection channels 19 are arranged axially beneath a stator lamination stack. The stator lamination stack is represented in FIG. 2 by a yoke stack 4. With said axial extension of the positioning of the meandering cooling channel 18, the cooling power can be increased. If a more compact construction is desired in which, for example, no end housing is integrated into the element 22, the deflection channels can also be positioned in the axial region of the stator lamination stack 4. This is not shown in FIG. 2.

Figure 3:
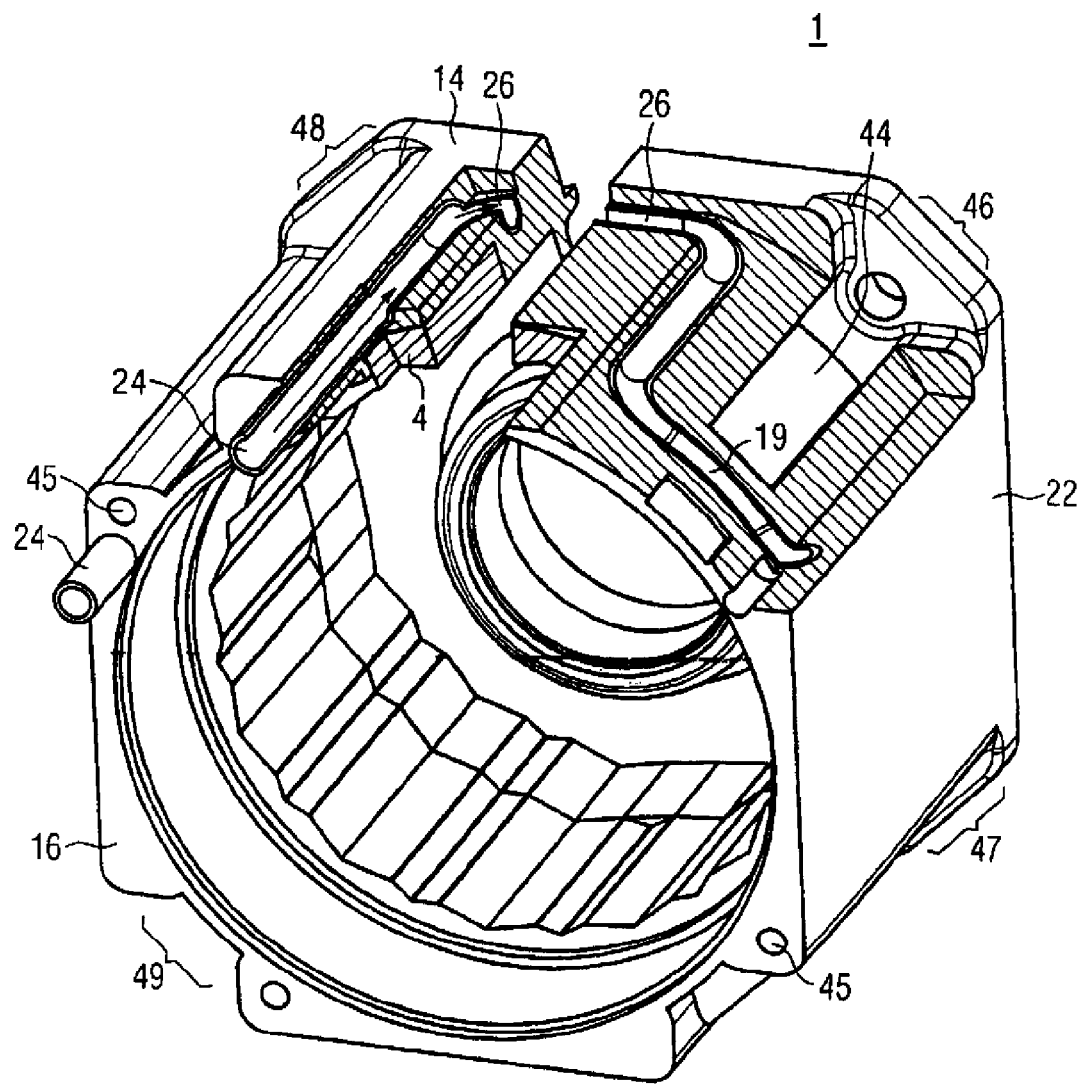
FIG. 3 is the cast stator in a sectional view.

FIG. 3 shows a section through the stator 1 of FIG. 2. Pipes 26 which are used as a cooling channel are shown in a sectional representation. Furthermore, as FIG. 2 shows, connections 24 for an inlet and an outlet of fluid are shown. The fastening holes 44 are arranged in corner regions 46, 47, 48 and 49 of the stator 1. In order to enable a compact construction, the stator 1 does not have an axially arranged cooling channel in the corner regions. Advantageous is a deflection channel 19 which is situated in a corner region 46, specifically in the region of an end face lying opposite the end face on which the fastening hole 44 is provided.

Figure 4:
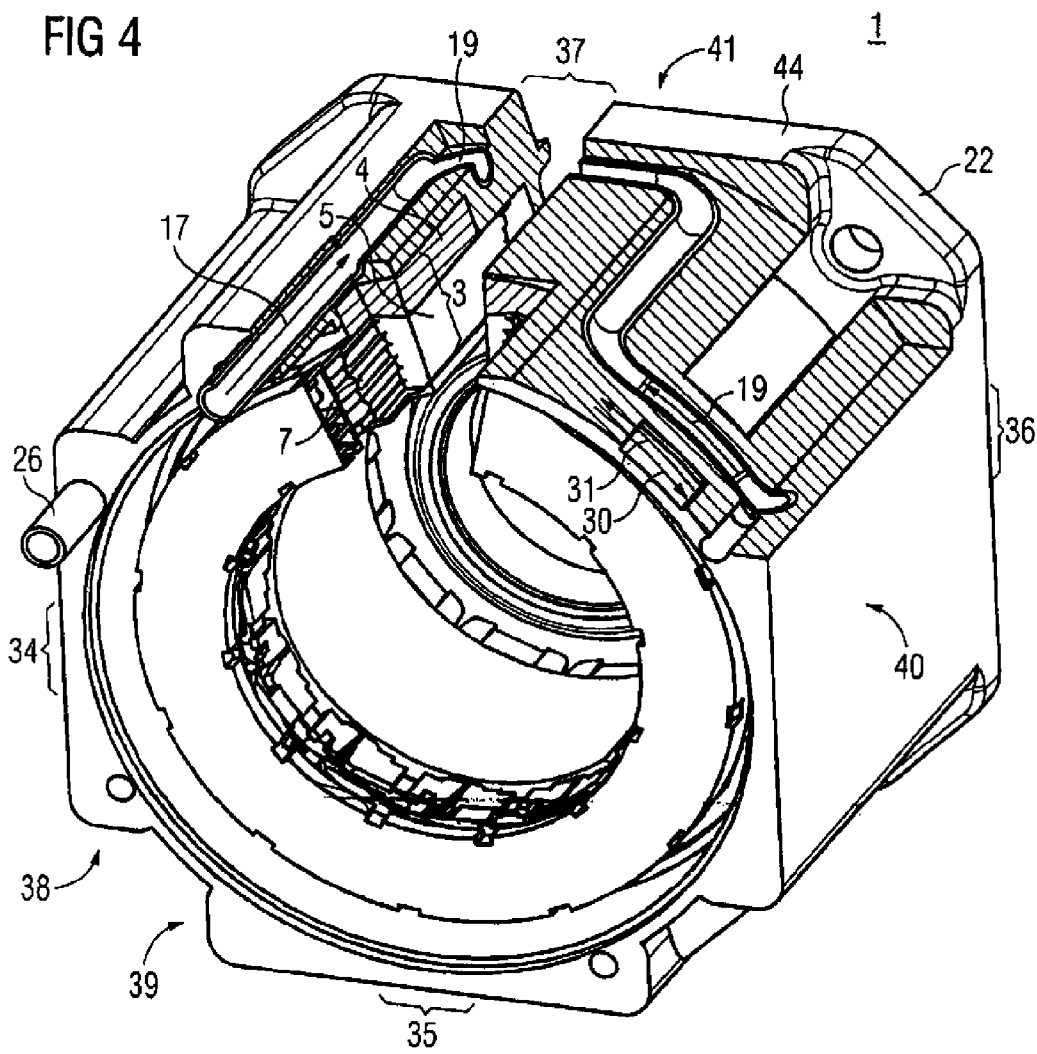
FIG. 4 is the cast stator with stator windings.

FIG. 4 shows, similarly to FIG. 3, the stator 1 with a sectional view. In addition to the yoke stack 4, a star-shaped stack 5 is also shown in FIG. 4. As shown, the electrical windings 7 of the stator 1 are arranged in the star-shaped stack 5. The stator 1 has a cuboid basic shape with side surfaces 38, 39, 40 and 41. These sides 38, 39, 40 and 41 have central regions 34, 35, 36, 37. Said central regions also have no axial cooling channels. This results in the possibility of a compact construction. The deflection channels can be arranged in the central regions 34, 35, 36, 37. The deflection channel 19 has an orientation in a circumferential direction which is indicated by the arrows 30 and 31. The deflection channel 19 is arranged in an axial region of the stator 1 into which the yoke stack 4 no longer extends. It is therefore possible to displace the deflection channel 19 radially inwardly relative to the axial channels 17. The deflection channel 19 is thus brought, for example, into a radial region in which the yoke (stator lamination stack) is also situated. This further enables a compact construction.

In electrical machines (e.g. electrical motors or generators) which have water cooling and a stator made from two radial partial stacks (an outer yoke stack 4 and an inner star-shaped stack 5), the water pipes (i.e. cooling channels) are arranged close to the heat sources, i.e. the motor windings or generator windings, and have low thermal resistance. Bores in the iron of the yoke stack and pipes laid therein for water cooling do not enable optimal heat transfer. Improved heat removal is enabled by using a casting or injection molding process. During the casting or injection molding processes, separate pipes are laid onto the yoke stack and embedded for water cooling. For this purpose, a previously meandering-formed pipe 26 is laid round the yoke stack 4. The pipe 26 and the yoke stack 4 are enclosed together using a suitable casting or injection molding material. As previously mentioned, a suitable material for the casting material is aluminum. Other metals or mechanically very robust and highly heat-conductive plastics are also suitable. The stator construction of the electric motor, as described, in a yoke stack 4 and a star-shaped stack 5 has the advantage that the yoke stack 4 can be separately machined and therefore subjected to processes that would destroy a wound one-piece stator stack (this might possibly be the case on injection molding with aluminum.) The meandering pipe 26 is arranged round the yoke stack and injection molded with aluminum to provide good thermal conductivity. Both the thermal conduction from the yoke stack to the highly heat-conductive casting material and the thermal conduction to the pipes is thereby improved, further supported by the improved axial heat conduction. The manufacturing process is also suitable for integrating further functions into the component/element. Further interfaces, such as the flange for the end housing and/or housing flange can also be injection molded. Furthermore, end housings, terminal boxes and/or plug housings can also be embedded.

Figure 5:
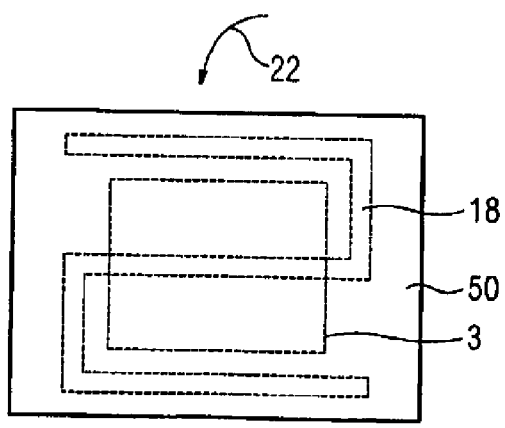
FIG. 5 is a stator lamination stack.

FIG. 5 shows schematically that an iron-containing body 3 for guiding a magnetic field (that is, a stator lamination stack) can be arranged in a mold 50. A meandering cooling channel 18 can also be arranged in said mold 50. The stator windings can be already located in the stator lamination stack or inserted into grooves later. For example, liquid aluminum can be poured into the mold 50. The liquid aluminum 22 hardens and embeds the stator lamination stack 3 and the cooling channel 18.

What is claimed is:

1. A stator of an electrical machine, comprising:
an element having embedded therein a meandering cooling channel and including a material which is thermally influenced to form the embedded cooling channel; and
an iron-containing body for guiding a magnetic field of the stator, said iron-containing body being embedded in the element, wherein the meandering cooling channel comprises a pipe, and wherein the pipe is made of a material which is partially melted.

2. The stator of claim 1, wherein the element comprises a sintered material.

3. The stator of claim 1, wherein the element comprises a cast material.

4. The stator of claim 3, wherein cast material is an aluminum alloy.

5. The stator of claim 1, wherein the element comprises an injection molded material.

6. The stator of claim 5, wherein the injection molded material is a plastics material.

7. The stator of claim 1, wherein the element is manufactured by means of a 3-D printing process.

8. The stator of claim 1, wherein the pipe is made of at least one material selected from the group consisting of stainless steel, copper, and plastics.

9. The stator of claim 1, wherein the pipe is made of a material having a melting point which is higher than a melting point of the material of the element which serves for embedding.

10. The stator of claim 1, wherein the pipe has at least one turn, said pipe being made in one part.

11. The stator of claim 1, wherein the meandering cooling channel has at least one cooling channel which is embedded in an axial direction and at least one cooling channel which is embedded in the element in a circumferential direction.

12. The stator of claim 11, constructed in the shape of a cuboid form having sides, said axial cooling channel being arranged away from a central region of the sides.

13. The stator of claim 11, wherein the element has a fastening hole provided in a corner region of the stator, said axial cooling channel being arranged away from the corner region of the stator.

14. The stator of claim 1, wherein the element has fastening holes for receiving screws for fastening.

15. The stator of claim 1, wherein further comprising a yoke stack, and a star-shaped stack, said yoke and star-shaped stacks forming part of the iron-containing body for guiding the magnetic field.

16. The stator of claim 1, wherein the element is configured to form at least part of a housing of the electrical machine.

17. The stator of claim 1, wherein the element is configured to have integrated therein an end housing of the electric machine.

18. The stator of claim 1, wherein the element is configured to have integrated therein two end housings of the electric machine.

19. A method for manufacturing a stator of an electrical machine, comprising:
    placing an iron-containing body in a mold;
    placing a cooling channel in the mold; and
    filling the mold with a heated material which is thermally influenced to form an element in which the cooling channel and a yoke of the electrical machine are embedded wherein the cooling channel is a pipe made of at least one material selected from the group consisting of stainless steel, copper, and plastics, and wherein the pipe is made of a material which is partially melted.

20. The method of claim 19, wherein the material is a sintered material.

21. The method of claim 19, wherein the material is a cast material.

22. The method of claim 21, wherein cast material is an aluminum alloy.

23. The method of claim 19, wherein the material is an injection molded material.

24. The method of claim 23, wherein the injection molded material is a plastics material.

25. The method of claim 19, further comprising curing the material, using a 3-D printing process.

26. The method of claim 19, wherein the pipe is made of a material having a melting point which is higher than a melting point of the material of the element which serves for embedding.

27. The method of claim 19, wherein the pipe has at least one turn and is made in one part.

* * * * *